(12) United States Patent
Griesau et al.

(10) Patent No.: US 6,507,306 B1
(45) Date of Patent: Jan. 14, 2003

(54) UNIVERSAL REMOTE CONTROL UNIT

(75) Inventors: Gene W. Griesau, Albany, NY (US); Rebecca J. Carlotti, Rotterdam Junction, NY (US)

(73) Assignee: Contec Corporation, Schenectady, NY (US)

( * ) Notice: Subject to any disclaimer, the term of this patent is extended or adjusted under 35 U.S.C. 154(b) by 0 days.

(21) Appl. No.: 09/419,605

(22) Filed: Oct. 18, 1999

(51) Int. Cl.$^7$ ............................................... H04L 29/00
(52) U.S. Cl. ...................... 341/176; 455/151.4; 359/146
(58) Field of Search ........................... 455/151.2, 151.1, 455/151.4; 359/142, 146; 341/176, 23, 175; 340/825.69, 825.24, 825.25, 825.72; 345/158, 169

(56) References Cited

U.S. PATENT DOCUMENTS

| | | | |
|---|---|---|---|
| 4,488,250 A | * 12/1984 | Lipsey et al. ............... | 708/137 |
| 4,703,359 A | 10/1987 | Rumbolt et al. .......... | 358/194.1 |
| 4,712,105 A | * 12/1987 | Kohler .................. | 340/825.69 |
| 4,746,919 A | 5/1988 | Reitmeier .............. | 340/825.56 |
| 4,774,511 A | 9/1988 | Rumbolt et al. ........ | 340/825.69 |
| 5,287,109 A | * 2/1994 | Hesse .................... | 340/309.15 |
| 5,297,204 A | 3/1994 | Levine ........................ | 380/10 |
| 5,341,166 A | 8/1994 | Garr et al. ..................... | 348/10 |
| 5,410,326 A | 4/1995 | Goldstein .................... | 348/134 |
| 5,412,377 A | * 5/1995 | Evans et al. ........... | 340/825.22 |
| 5,414,426 A | * 5/1995 | O'Donnell et al. .... | 340/825.57 |
| D366,263 S | 1/1996 | Darbee et al. ............. | D14/218 |
| 5,481,252 A | * 1/1996 | Kwon et al. ........... | 340/825.22 |
| 5,539,391 A | 7/1996 | Yuen .................... | 340/825.72 |
| 5,644,303 A | * 7/1997 | Gioscia ....................... | 200/5 A |
| 5,710,605 A | 1/1998 | Nelson ........................ | 348/734 |
| RE35,954 E | 11/1998 | Levine ......................... | 380/10 |
| 5,872,562 A | 2/1999 | McConnell et al. ........ | 345/169 |
| 5,959,751 A | * 9/1999 | Darbee et al. .............. | 359/146 |
| 6,008,735 A | * 12/1999 | Chiloyan et al. ...... | 340/825.22 |
| 6,157,319 A | * 12/2000 | Johns et al. ............. | 340/10.31 |
| 6,236,350 B1 | * 5/2001 | Andrews ............... | 340/825.69 |

FOREIGN PATENT DOCUMENTS

EP 0 566 516 A1 10/1993

OTHER PUBLICATIONS

Universal Electronics, Inc., "The Millennium 4," two pages, (1999).
Universal Electronics, Inc., "We don't just make wireless devices. We make your life easier," four pages, 1999.
US Electronics Components Corporation, "4–in–1 Remote Controls," two pages, (May 1998).
Universal Electronics, Inc,. "The Millennium 3," two pages, (1999).
Primestar, "PrimeFinder Remote Control User's Manual," four pages, (date unknown).
US Electronics Components Corporation, "3–in–1 Remote Controls," two pages, (May 1998).

* cited by examiner

Primary Examiner—Michael Horabik
Assistant Examiner—Hung Dang
(74) Attorney, Agent, or Firm—Heslin Rothenberg Farley & Mesiti P.C.

(57) ABSTRACT

A universal remote control unit for controlling the operation of a plurality of devices such as a cable box, a television, a video device, and an audio device, includes a processor having a plurality of operating modes, a first mode push button for initiating a mode change, and a plurality of second mode push buttons corresponding respectively to a plurality of devices for enabling a user to select one of the plurality of operating modes. The processor is operable in a selected one of the plurality of operating modes, upon activation of one of the second mode push buttons within a predetermined amount of time of activation of the first mode push buttons. The universal remote control unit is effective to reduce the likelihood of unintentionally changing the operating mode. In addition, the universal remote control unit may also be effective to readily allow a user to readily determine the current operating mode of the universal remote control unit by pressing the first mode push button, and selectively turn on/of the devices using the second mode push buttons.

34 Claims, 3 Drawing Sheets

UNIVERSAL REMOTE CONTROL UNIT

TECHNICAL FIELD

The present invention relates generally to remote control units, and more particularly, to remote control units for remotely controlling a plurality of devices.

BACKGROUND INFORMATION

Remote control units have gained widespread popularity for use in remotely controlling home entertainment systems which typically include several devices such as a television set, a cable box or converter, a videocassette recorder, and a stereo. Often, with each device, the manufacturer will supply a remote control unit for use in remotely controlling that device.

A universal remote control unit provides a single unit having a plurality of operating modes for controlling a plurality of devices. Each operating mode allows a user to remotely control a respective one of the devices. Typically, a universal remote control unit includes a plurality of mode push buttons, e.g., CABLE, TV, and VCR push buttons, which correspond to the different devices to be controlled and which are used to directly change the operating mode of the universal remote control unit.

Changing operating modes of the universal remote control is often accomplished by simply pressing the appropriate mode push button, i.e., CABLE, TV or VCR push button. For example, with the universal remote control unit in the cable mode, to turn on the cable box, a user presses a POWER push button. Next, if the user wants to turn on the television set, the user must first press the TV push button then the POWER push button. Thereafter, in order to operate the cable box again, the user must then press the CABLE push button before selecting, for example, the channel up or down push buttons on the universal remote control unit. Later, if the user wishes to turn off the television and the cable box, the user must press the CABLE push button, the POWER push button, the TV push button, and then the POWER push button.

A drawback with this type of universal remote control unit is that it is easy for a user to unintentionally change the operating mode of the universal remote control unit by inadvertently pressing the CABLE, TV or VCR push buttons. Another drawback is that the operation of the universal remote control is often confusing, particularly when a user first turns on several devices and desires to control one of the devices without first placing the universal remote control back in the proper operating mode to control that device. A further drawback is that numerous button presses are typically required to turn on/off multiple devices.

Other universal remote control units have included a single mode push button instead of separate push buttons corresponding to each of the devices. By pressing the mode push button, the operating mode of the universal remote control unit changes, i.e., cycles, from one operating mode to the next.

A drawback with this type of universal remote control unit is that it is often necessary to press the mode push button a number of times in order to change from one operating mode to another. Another drawback with this type of universal remote control unit is that it is also easy for a user to unintentionally change the operating mode of the universal remote control unit by inadvertently pressing the mode push button.

SUMMARY OF THE INVENTION

Therefore, there is a need for a universal remote control unit, which reduces the likelihood of the user unintentionally changing the operating mode of the universal remote control unit. In addition, desirably the universal remote control unit allows the user to readily determine the current operating mode, turn on/off the devices with fewer button presses, and may be user programmable to simplify the operation of the universal remote control unit.

The above-mentioned drawbacks are overcome by the present invention which provides a universal remote control unit for remotely controlling a plurality of devices in which the universal remote control unit includes a function means for enabling a user to select a plurality of functions in connection with the operation of the plurality of devices, a transmitter, and a processor having a plurality of operating modes each of which corresponding to a different one of the plurality of devices. The processor is operable in each of the plurality of operating modes to control transmission from the transmitter in response to activation of the function means by the user to remotely control a corresponding one of the plurality of devices.

The universal remote control unit further includes a first mode means and a plurality of second mode means which enable the user to select one of the plurality of operating modes, each of the second mode means corresponds to one of the plurality of devices, and the processor is operable in a selected one of the plurality of operating modes, upon activation of one of the second mode means within a predetermined amount of time of activation of the first mode means.

Desirably, the processor may be operable to control transmission from the transmitter to turn on/off at least one of the plurality of devices upon activation of at least one of the plurality of second mode means, e.g., upon activation of at least one of the plurality of second mode means after the predetermined time. The processor may also be operable to control transmission from the transmitter in response to a user-programed selection of a plurality of functions upon activation of one of the second mode means. Advantageously, the universal remote control unit may further include means for indicating a current operating mode upon activation the first mode means.

In another aspect of the invention, a method for operating a universal remote control unit having a plurality of operating modes for remotely controlling a plurality of devices with each of the plurality of operating modes corresponding to a different one of the plurality of devices includes, providing a first mode means and one of a plurality of second mode means for enabling a user to select the plurality of operating modes, and operating the universal remote control unit in a selected one of the plurality of operating modes upon activation of one of the second mode means within a predetermined amount of time of activation of the first mode means.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiments and the accompanying drawings in which:

DETAILED DESCRIPTION OF THE INVENTION

Figure 1:
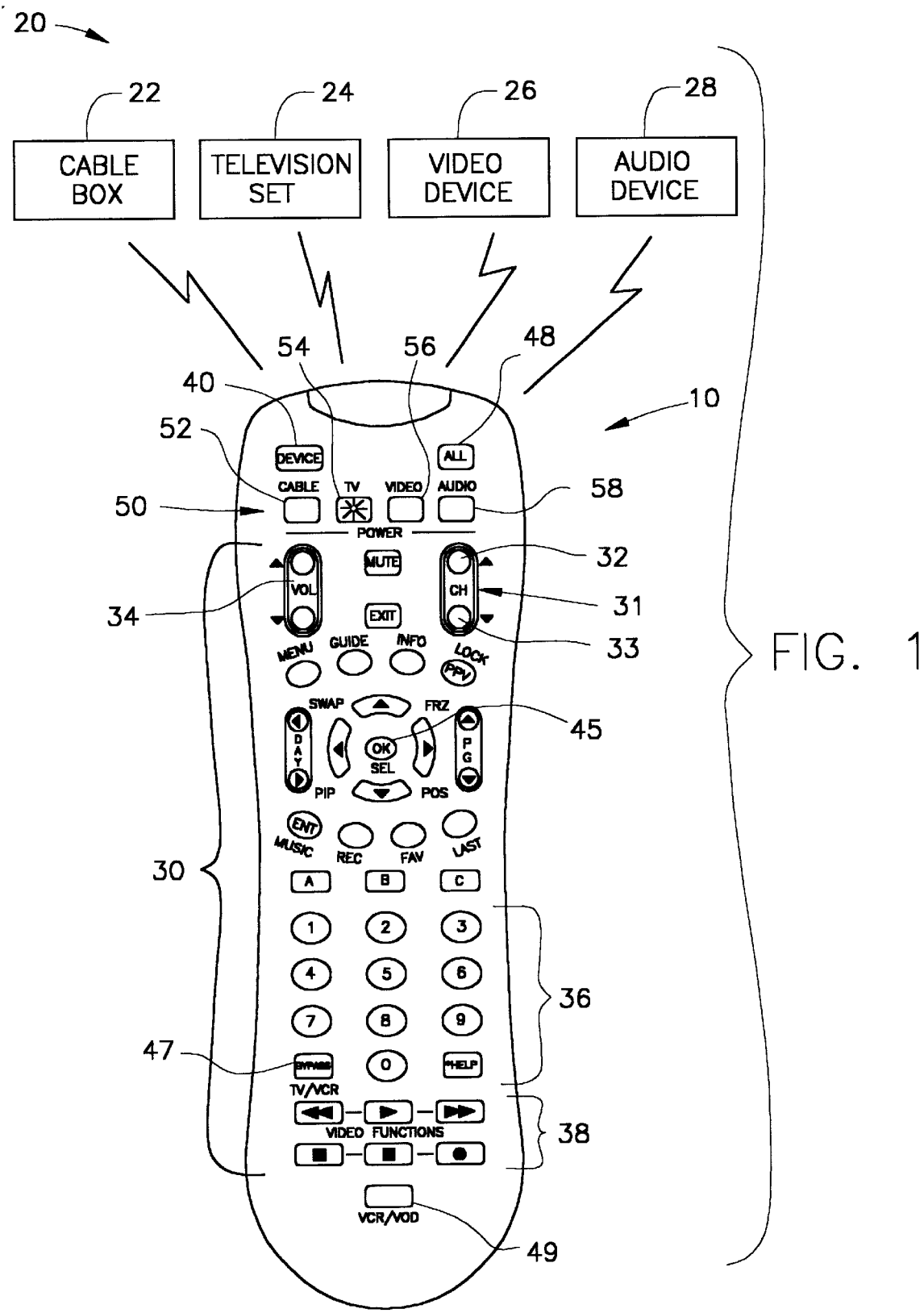
FIG. 1 is front plan view of one embodiment of a universal remote control unit according to the present invention along with several devices controllable by the universal remote control unit.

FIG. 1 illustrates an exemplary universal remote control unit 10 of the present invention for controlling a plurality of devices 20. As will be explained in greater detail below, universal remote control unit 10 is configured to be effective to reduce the likelihood of unintentionally changing the operating mode of universal remote control unit 10. In addition, universal remote control unit 10 readily allows a user to determine the current operating mode of remote control unit 10. Furthermore, universal remote control unit 10 may include individual mode buttons for each device that turn on/off each device and which mode buttons may be user-programmable to simplify operating universal remote control unit 10.

Examples of the plurality of devices 20 which may be controlled by universal remote control unit 10 include a cable box or converter 22, a television set 24, a video device 26 such as a videocassette recorder, a digital video disk (DVD) player, or a laser-disk (LD) player, and an audio device 28 such as an amplifier, a digital music converter, or an audio-video receiver.

With reference to FIG. 1, universal remote control unit 10 includes input means 12 (FIG. 2) which may include function means or a keyboard 30 for enabling a user to select a plurality of functions in connection with the operation of the plurality of devices 20. As best shown in FIG. 1, keyboard 30 may include a CHANNEL push button 31, a VOLUME push button 34, a plurality of numbered push buttons 36, a plurality of video function push buttons 38, etc.

In addition, as explained in greater detail below, input means 12 (FIG. 2) also includes a first mode means or DEVICE push button 40 for initiating a mode change, and a plurality of second mode means or mode push buttons 50 such as a CABLE push button 52, a TV push button 54, a VIDEO push button 56, and an AUDIO push button 58 for placing universal remote control unit 10 in a respective one of a plurality of operating modes. For example, universal remote control unit 10 in its cable mode operates the functions of the cable box 22. In its television mode, universal remote control unit 10 operates the functions of television set 24. Desirably, as explained below, each of the plurality of mode push buttons may be illuminatable, having, for example, a backlit light-emitting diode.

Figure 2:
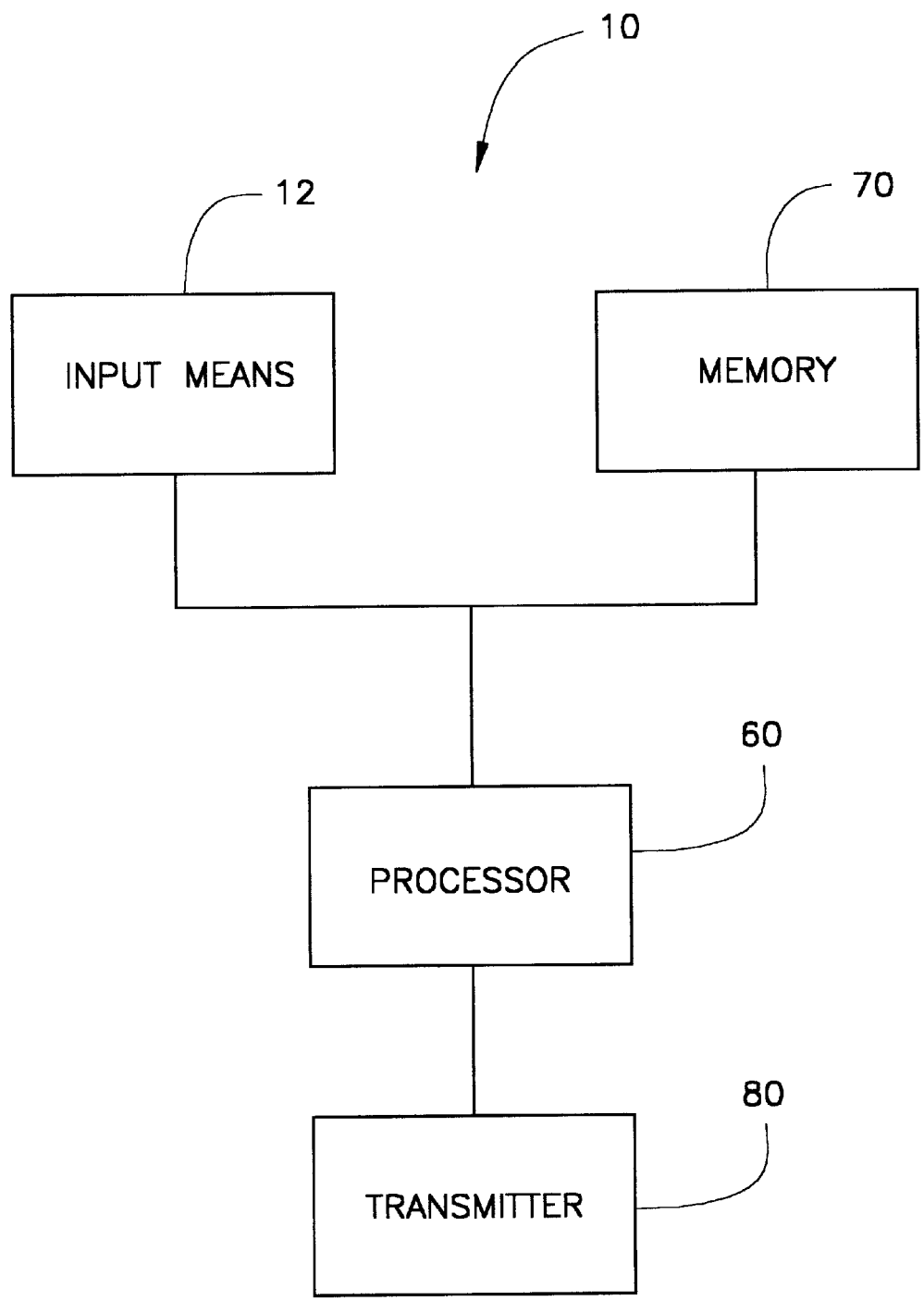
FIG. 2 is a block diagram of the universal remote control unit shown in FIG. 1.

With reference to FIG. 2, universal remote control unit 10 includes, in addition to input means 12, a processor 60 having a plurality of operating modes each of which corresponds to a different one of the plurality of devices 20 (FIG. 1), a memory 70, and a transmitter 80. Activation of one of the plurality of push buttons of keyboard 30 (FIG. 1) by a user generates a command signal when depressed. This command is supplied to processor 60. In response thereto, processor 60 retrieves an appropriate control code from a memory 70, as is well known in the art. Processor 60 then causes transmitter 80 such as an infrared transmitter to generate pulses in accordance with the control code, which are received by one of the plurality of devices 20 (FIG. 1) thereby causing one of the controlled devices, e.g., cable box 22, television 24, video device 26, or audio device 28, to carry out the command function.

Processor 60 may include a programmable infrared (IR) low-voltage microcontroller device. Examples of such a device include a Z8 MCU single-chip device from Zilog, Inc., and a GMS344XXXT series device from LG (Goldstar) Semicon Co., Ltd. The processor is run by application software or programming, e.g., assembly language, and is typically governed by the manufacturer's protocol. The devices can be of single package design or multiple package design with external or additional memory storage from the processor.

The invention is not limited to such a processing environment, however. The present invention can be incorporated and be used within many types of processing environments. From the following description, computer readable program code means for use in processor 60 and for implementing the present invention may be readily programmed by those skilled in the art and stored in memory 70 such as memory chip or an integrated circuit.

Figure 3:
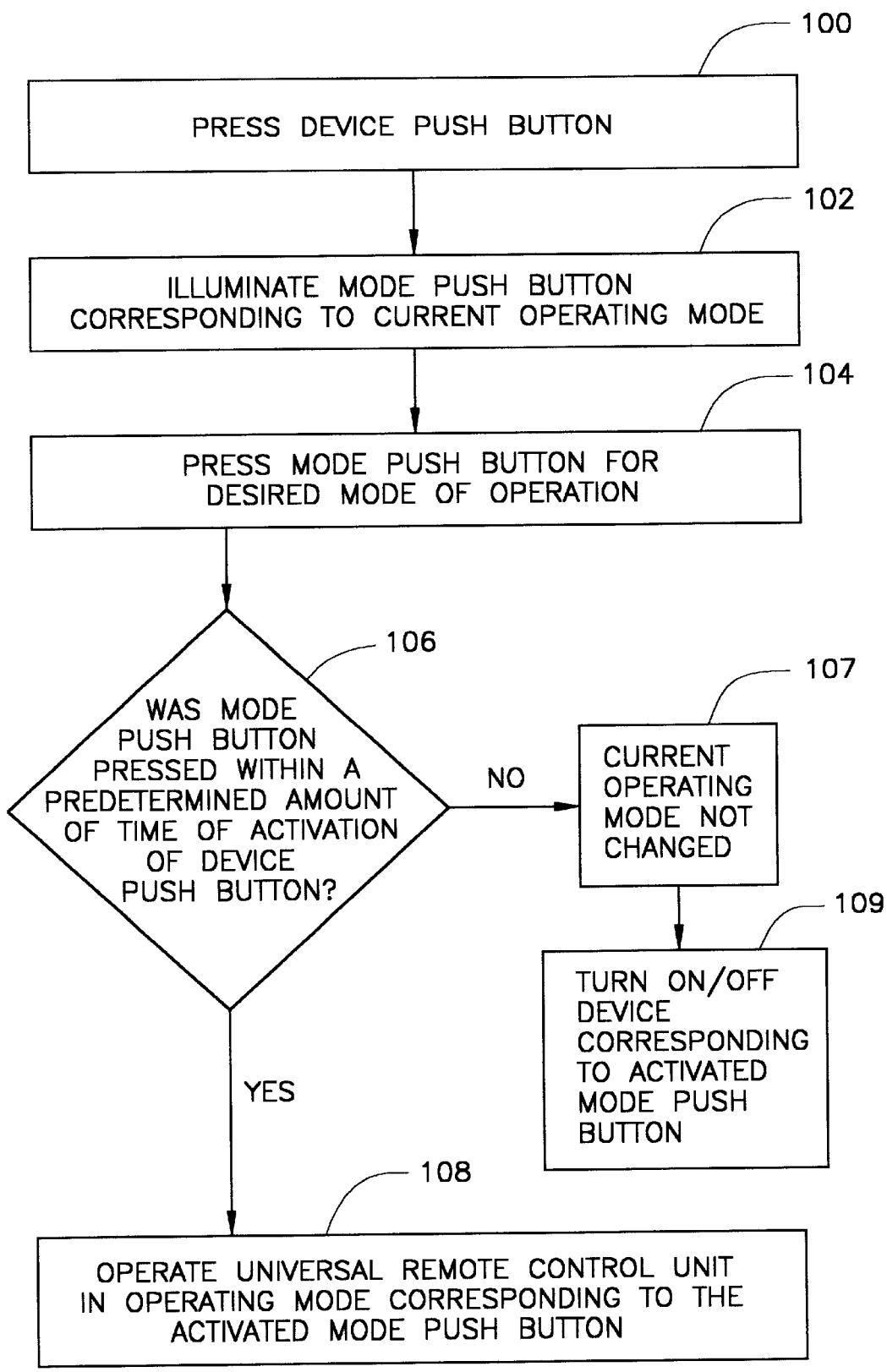
FIG. 3 is a flow chart of a process for operating the remote control unit shown in FIG. 1.

FIG. 3 is a flowchart of an exemplary process of the invention operating universal remote control unit 10. As discussed in greater detail below, identifying the current operation mode and changing the operating modes of universal remote control unit 10 are accomplished through use of DEVICE push button 40.

Identifying Current Operating Mode

With reference still to FIG. 3, if a user does not know which is the current operating mode of universal remote control unit 10, processor 60 (FIG. 2) may be programmed so that the user at 100 can press DEVICE push button 40 (FIG. 1) which causes one of mode push buttons 50 (FIG. 1) to illuminate which corresponds to the current mode of operation of universal remote control unit 10 at 102. For example, if the current mode is the television operating mode, TV push button 54 remains illuminated, as illustrated in FIG. 1, desirably for a predetermined amount of time. The predetermined amount of time may be from about five seconds to about ten seconds.

With reference again to FIG. 1, if the identified current operating mode after activating DEVICE push button 40 is the operating mode desired by the user, 'the user may then activate the other push buttons, e.g. function push buttons, of keyboard 30 to control that device. For example, if the current mode is the television mode, CHANNEL push button 31 can be activated for increasing/decreasing the channels of television set 24, or VOLUME push button 34 can be activated for increasing/decreasing the volume of television set 24.

Changing Operating Modes

With reference to again FIG. 3, processor 60 (FIG. 2) may be programmed so that changing the operating mode of universal remote control unit 10 comprises pressing DEVICE push button 40 (FIG. 1), for example, at 100, pressing one of mode push buttons 50 (FIG. 1) at 104, and determining whether the mode push button was pressed within a predetermined amount of time at 106. If one of the mode push buttons 50 is selected within the predetermined amount of time, at 108 the operating mode is set and/or changed to the activated mode push button. This predetermined amount of time may be from about five to about ten seconds, and desirably corresponds to the current operating amount of time for illuminating the mode push button corresponding to the current operating mode.

With reference again to FIG. 1, for example, after pressing DEVICE push button 40, and while the mode push button corresponding to the current operating mode is illuminated, e.g., TV push button 54, the user can select a different device to operate by pressing one of the other non-illuminated mode push buttons 50, e.g., CABLE push button 52, VIDEO push button 56, or AUDIO push button 58. Desirably, when a non-illuminated mode push button 50 is selected, the mode push button illuminates, for example, blinks and then goes out, at 108 (FIG. 3).

By requiring a user to activate two push buttons and also activate the two push buttons within a predetermined time, the likelihood of a user unintentionally changing the operating mode of universal remote control unit 10 is reduced.

Turning On/off the Devices

Mode push buttons 50 may also be used and processor 60 suitably programmed so that activation of each mode push buttons 50 turns on/off a corresponding one of devices 20. This is accomplished by not pressing device button 40 and only pressing one of mode push buttons 50, e.g., CABLE push button 52, TV push button 54, VIDEO push button 56, and AUDIO push button 58. For example, if a mode push button is not pressed within the predetermined time of pressing DEVICE push button 40, the current operating mode is not changed at 107 (FIG. 3), and the activated mode push button 50 toggles that device on/off at 109 (FIG. 3). Activating any of the mode push buttons 50 thereafter toggles the corresponding device on/off.

Programmable Mode Push Buttons

Universal remote control unit 10 may also include user-programmable mode push buttons 50 that can be programmed, for example with up to eight functions in addition to its normal function (e.g., power on/off toggle) to transmit a plurality of functions that simplify the operation of universal remote control unit 10 and desirably reduce the number of push button presses. Desirably, keyboard 30 includes a programing push button or OK/SEL push button 45 for use in programming processor 60 as described below.

Programmable TV Push Button

As discussed above, TV push button 54 and DEVICE push button 40 may be used to identify and/or change the operating mode of universal remote control unit 10, as well as turn on and off television set 24.

Desirably, TV push button 54 may also be user-programmable to transmit a plurality of functions in addition to its normal (television power on/off toggle) function. For example, the user can program processor 60 so that TV push button 54 turns on (or off) television set 24 and tunes television set 24 to any desired channel (typically channel 3) with one push button press.

For example, processor 60 may be programmed to allow TV push button 54 to be programmed as follows. With universal remote control unit 10 in the television mode, TV push button 54 and OK/SEL push button 45 are pressed at the same time and held down until TV push button 54 illuminates indicating that processor 60 is ready to receive a plurality of push button presses. With TV push button 54 illuminated, TV push button 54, numerical push button "0," and numerical push button "3" are pressed in order. To store the desired push button presses in processor 60, an end-programing push button or CHANNEL UP push button 32 is pressed. Thereafter, when TV push button 54 is pressed, universal remote control unit 10 performs the above-noted actions for controlling television set 24.

Programmable CABLE Push Button

As discussed above, CABLE push button 52 and DEVICE push button 40 may be used to identify and/or change the operating mode of universal remote control unit 10, as well as turn on and off cable box 22.

Desirably, CABLE push button 52 may also be user-programmable to transmit a plurality of functions in addition to its normal (cable power on/off toggle) function. For example, the user can program processor 60 so that CABLE push button 52 turns on cable box 22 and television set 24 with one push button press.

For example, processor 60 may be programmed to allow CABLE push button 52 to be programmed as follows. With universal remote control unit 10 in the cable mode, CABLE push button 52 and OK/SEL push button 45 are pressed at the same time and held down until CABLE push button 52 illuminates indicating that processor 60 is ready to receive a plurality of push button presses. With CABLE push button 52 illuminated, CABLE push button 52, TV push button 54 are pressed in order. To store the desired push button presses in processor 60, an end-programing push button CHANNEL UP push button 32 is pressed. Thereafter, when CABLE push button 52 is pressed, universal remote control unit 10 performs the above-noted actions for controlling cable box 22 and television set 24.

Programmable BYPASS Push Button

Universal remote control unit 10 may also desirably include a BYPASS push button 47, the activation of which results in transmission of a command for activating/deactivating the bypass mode of cable box 22. Typically, the bypass mode on cable box 22 is designed to allow the user to record one program through cable box 22 via video device 26 while watching a different program on television set 24. A common problem is that users forget to re-tune their television to channel 3 (or 4) when exiting the cable box' bypass mode which results in no picture or a snowy picture at best.

Desirably, BYPASS push button 47 may also be user-programmable to transmit a plurality of functions in addition to its normal (cable bypass on/off toggle) function. Advantageously, BYPASS push button 47 can be programmed so that any time it is pressed, it will also tune television set 24 to a specific channel, e.g., channel 3 (or 4). This is desirable because when exiting the bypass mode of cable box 22, television 24 should be re-tuned to its default channel, typically channel 3 (or 4), for proper cable reception.

Processor 60 may be programmed to allow BYPASS push button 47 to be programmed as follows. With universal remote control unit 10 in the cable mode, BYPASS push button 47 and OK/SEL push button 45 are pressed at the same time and held down until CABLE push button 52 illuminates indicating that processor 60 is ready to receive and store a plurality of push button presses. With CABLE push button 52 illuminated, DEVICE push button 40, TV push button 54, numerical push button "0," and numerical push button "3," are pressed in order. To store the desired push button presses in processor 60, an end-programing push button or CHANNEL UP push button 32 is pressed. Thereafter, pressing BYPASS push button 47, universal remote control unit 10 performs the above-noted actions for controlling cable box 22 and television set 24.

To return TV push button 54, CABLE push button 52, BYPASS push button 47 to their normal default settings, programming for each push button is initiated, and the CHANNEL DOWN push button 33 is pressed.

VCR/VOD

Cable box 22 may also include "video-on-demand" capability, which allows a viewer the ability to watch a movie. When a video-on-demand movie is ordered, it is downloaded into the memory of cable box 22 where the viewer can watch it similar to a rented movie on tape, e.g., using the VCR push buttons on a remote control unit to control various functions, e.g., play, stop, rewind, etc.

Universal remote control unit 10 may further comprise a VCR/VOD push button 49 and processor 60 programmed to allow the plurality of video function push buttons 38 to be used for activating control of video device 26, or for controlling the viewing a video-on-demand movie stored in cable box 22. From the present description, it will be appreciated that VCR/VOD push button 49 and processor 60 eliminates changing operating modes of universal remote control unit 10 between the cable mode and video mode.

For example, pressing VCR/VOD push button 49, the current mode (function) of the plurality of video function push buttons 38 may be indicated by illumination of either VIDEO push button 56 or CABLE push button 52. While the current mode, either the VIDEO push button or CABLE push button is illuminated, within a predetermine amount of time, pressing VCR/VOD push button 49 again switches the function of the video function push buttons 38 to the other, non-illuminated, mode. Desirably, when the operating mode (cable or video device) of the video function push buttons 38 is changed, the new mode push button (CABLE push button or VIDEO push button) blinks and goes out.

Preprogrammed all Push Button

Universal remote control unit 10 may also include an ALL push button 48 which turns on/off all of the devices upon one button press. Desirably, once a user sets up universal remote control unit to operate the various devices, processor 60 is desirably programmed so that activation of ALL push button 48 turns on/off the power to each of the devices.

Advantageously, from the present description, remote control unit 10 overcomes a number of major operational problems that users of prior art universal remote control units encounter. For one, universal remote control unit 10 makes it more difficult for users to unintentionally change operating modes of remote control unit 10. This is accomplished by requiring the user to first press a DEVICE push button, followed by the mode push button for the device to be operated within a predetermined amount of time. Second, remote control unit 10 reduces the number of push button presses required to turn on/off a plurality of devices by making each mode push button operate as a power on/off for its device. Third, the illuminated mode push buttons readily allow identification of the device being operated. Fourth, the VCR/VOD push button allows switching the function of the video function push buttons between the cable box and the video device. Fifth, making the various mode push buttons user-programmable further reduces the number of push button presses necessary for remotely controlling a plurality of devices.

From the present description, it will be appreciated by those skilled in the art that a suitable display, e.g., liquid crystal display having a touch screen, may be used instead of the push buttons for allowing a user to select an operating mode and/or a function for remote control of the devices. In addition, it will be appreciated by those skilled in the art that instead of illuminatable push buttons, one or more light-emitting diodes may be disposed on universal remote control unit to indicate the current operating mode, indicate a change in the operating mode, etc. Further, it will be appreciated that instead of a cable mode button, a digital satellite system receiver button may be provided for controlling such a receiver.

Thus, while various embodiments of the present invention have been illustrated and described, it will be appreciated to those skilled in the art that many changes and modifications may be made thereunto without departing from the spirit and scope of the invention.

What is claimed is:

1. A universal remote control unit for remotely controlling a plurality of devices, said universal remote control unit comprising:

functional means for enabling a user to select a plurality of functions in connection with the operation of the plurality of devices;

a transmitter;

a processor having a plurality of operating modes each of which corresponding to a different one of the plurality of devices, and said processor being operable in each of said plurality of operating modes to control transmission from said transmitter in response to activation of said function means by the user;

a first mode means and a plurality of second mode means for enabling the user to select one of the plurality of operating modes, each of said second mode means corresponding to one of the plurality of devices; and said processor being operable in a selected one of the plurality of operating modes, upon activation of one of said second mode means within a predetermined amount of time of activation of said first mode means.

2. The universal remote control unit of claim 1 wherein said processor is operable to control transmission from said transmitter to turn on/off at least one of the plurality of devices upon activation of at least one of the plurality of second mode means.

3. The universal remote control unit of claim 1 wherein said processor is operable to control transmission from said transmitter to turn on/off at least one of the plurality of devices upon activation of at least one of the plurality of second mode means after the predetermined time.

4. The universal remote control unit of claim 1 wherein said processor is operable to control transmission from said transmitter in response to a user-preprogramed selection of a plurality of functions upon activation of one of said second mode means.

5. The universal remote control unit of claim 1 wherein said first mode means and said plurality of second mode means comprise a plurality of push buttons.

6. The universal remote control unit of claim 1 further comprising means for indicating a current operating mode upon activation said first mode means.

7. The universal remote control unit of claim 6 wherein said means for indicating a current operating mode comprises said second mode means comprising a plurality of illuminable push buttons.

8. The universal remote control unit of claim 7 wherein said processor comprises means for controlling illumination of one of said plurality of illuminable push buttons for the predetermined amount of time upon activation of said second mode means.

9. The universal remote control unit of claim 1 further comprising toggle means for enabling a user to alternate between use of said function means to operate a video device to view a movie and a cable box to view a video-on-demand movie, and said processor being operable, upon activation of said toggle means twice within a predetermined amount of time to selectively control transmission from said transmitter in response to selection of said function means by the user to remotely control one of the video device and the cable box.

10. The universal remote control unit of claim 1 wherein said second plurality of mode means comprise four push buttons and said processor being operable to control transmission from said transmitter to respectively turn on/off four devices upon activation of said four push buttons.

11. A television system comprising:

a television set; and a universal remote control unit of claim 1 for remote control of said television set.

12. A system for receiving cable television, the system comprising:

a cable box; and a universal remote control unit of claim 1 for remote control of said cable box.

13. A method for operating a universal remote control unit having a plurality of operating modes for remotely controlling a plurality of devices, each of the plurality of operating modes corresponding to a different one of the plurality of devices, the method comprising:

provide a first mode means and a plurality of second mode means for enabling a user to select the plurality of operating modes; and operating the universal remote control unit in one of the plurality of operating modes upon activation of one of the second mode means within a predetermined amount of time of activation of the first mode means.

14. The method of claim 13 further comprising controlling transmission from a transmitter to turn on/off at least one of the plurality of devices upon activation of at least one of the plurality of second mode means.

15. The method of claim 13 further comprising controlling transmission from a transmitter to turn on/off at least one of the plurality of devices upon activation of at least one of the plurality of second mode means after the predetermined time.

16. The method of claim 13 further comprising controlling transmission from a transmitter in response to a user-preprogramed selection of a plurality of functions of controlling the devices upon activation of one of the second mode means.

17. The method of claim 13 wherein the first mode means and the plurality of second mode means comprise a plurality of push buttons.

18. The method of claim 13 further comprising indicating a current operating mode upon activation the first mode means.

19. The method of claim 18 wherein the indicating a current operating mode comprises the second mode means comprising a plurality of illuminable push buttons.

20. The method of claim 18 wherein the indicating a current operating mode comprises illuminating one of the plurality of illuminable push buttons for the predetermined amount of time upon activation of the first mode means.

21. The method of claim 13 further comprising providing toggle means for enabling a user to alternate between use of the function means to operate a video device to view a movie and to operate a cable box to view a video-on-demand movie, and selectively controlling, upon activation of the toggle means within a predetermined amount of time, transmission from the transmitter in response to selection of the function means by the user to remotely control one of the video device and the cable box.

22. The method of claim 13 wherein the second plurality of mode means comprise four push buttons, and the processor being operable to control transmission from the transmitter to respectively turn on/off four devices upon activation of the four push buttons.

23. A universal remote control unit for remotely controlling a plurality of devices, said universal remote control unit comprising:

an input unit for enabling a user to select a plurality of functions in connection with the operation of the plurality of devices;

a transmitter;

a processor having a plurality of operating modes each of which corresponding to a different one of the plurality of devices, and said processor being operable in each of said plurality of operating modes to control transmission from said transmitter in response to activation of said input unit by the user;

a device key and a plurality of mode keys for enabling the user to select one of the plurality of operating modes, each of said mode keys corresponding to one of the plurality of devices; and said processor being operable in a selected one of the plurality of operating modes, upon activation of one of said mode keys within a predetermined amount of time of activation of said device key.

24. The universal remote control unit of claim 23 wherein said processor is operable to control transmission from said transmitter to turn on/off at least one of the plurality of devices upon activation of at least one of the plurality of mode keys.

25. The universal remote control unit of claim 23 wherein said processor is operable to control transmission from said transmitter in response to a user-preprogramed selection of at least one of said plurality of functions upon activation of one of said plurality of mode keys.

26. The universal remote control unit of claim 23 wherein said mode keys comprise illuminable keys, and said processor being operable to control illumination of one of said mode keys corresponding to the current operating mode of said universal remote control for the predetermined amount of time upon activation of said device key.

27. A television system comprising:

a television set; and a universal remote control unit of claim 23 for remote control of said television set.

28. A system for receiving cable television, the system comprising:

a cable box; and a universal remote control unit of claim 23 for remote control of said cable box.

29. A method for operating a universal remote control unit having a plurality of operating modes for remotely controlling a plurality of devices, each of the plurality of operating modes corresponding to a different one of the plurality of devices, the method comprising:

providing a device key and a plurality of mode keys for enabling a user to select the plurality of operating modes; and operating the universal remote control unit in one of the plurality of operating modes upon activation of one of the mode keys within a predetermined amount of time of activation of the device key.

30. The method of claim 29 further comprising controlling transmission from a transmitter to turn on/off at least one of the plurality of devices upon activation of at least one of the plurality of mode keys.

31. The method of claim 29 further comprising controlling transmission from a transmitter in response to a user-preprogramed selection of at least one of a plurality of functions for controlling the devices upon activation of one of the plurality of mode keys.

32. The method of claim 29 further comprising indicating a current operating mode upon activation of the device key.

33. The method of claim 32 wherein the indicating the current operating mode comprises illuminating one of the plurality of mode keys for the predetermined amount of time upon activation of the device key.

34. A method for selecting an operating mode of a universal remote control for controlling a plurality of devices, the method comprising:

activating a device key;

activating one of a plurality of mode keys to select the operating mode of the universal remote control; and wherein the activating one of the plurality of mode keys comprises activating one of the plurality of mode keys within a predetermined time of activating of the device key.

* * * * *

UNITED STATES PATENT AND TRADEMARK OFFICE
CERTIFICATE OF CORRECTION

PATENT NO. : 6,507,306 B1  Page 1 of 1
DATED : January 14, 2003
INVENTOR(S) : Griesau et al.

It is certified that error appears in the above-identified patent and that said Letters Patent is hereby corrected as shown below:

<u>Title page,</u>
Item [57], ABSTRACT,
The last sentence, delete "on/of" and insert -- on/off --

<u>Column 8,</u>
Line 35, insert the word -- of -- after the word "activation"

<u>Column 9,</u>
Line 30, insert the word -- of -- after the word "activation"

Signed and Sealed this

Twenty-fifth Day of March, 2003

JAMES E. ROGAN
*Director of the United States Patent and Trademark Office*